United States Patent [19]

Oppelt et al.

[11] 4,439,951
[45] Apr. 3, 1984

[54] GRINDING MACHINE

[75] Inventors: Peter Oppelt, Hamburg; Uwe Uhlig, Buchholz; Werner Redeker, Börnsen; Werner Peschik, Neu-Börnsen, all of Fed. Rep. of Germany

[73] Assignee: Hauni-Werke Körber & Co. KG., Hamburg, Fed. Rep. of Germany

[21] Appl. No.: 283,385

[22] Filed: Jul. 15, 1981

[30] Foreign Application Priority Data

Jul. 19, 1980 [DE] Fed. Rep. of Germany ....... 3027504

[51] Int. Cl.³ .............................................. B24B 7/00
[52] U.S. Cl. ................................ 51/80 R; 51/165.71
[58] Field of Search ............ 51/165.77, 165.71, 80 R, 51/81 R, 80 A, 225, 124 R

[56] References Cited

U.S. PATENT DOCUMENTS

| 407,721 | 7/1889 | Cox | 51/225 X |
|---|---|---|---|
| 3,521,405 | 7/1970 | Mackey | 51/124 R |
| 4,179,854 | 12/1979 | Munekata | 51/165.77 |
| 4,226,053 | 10/1980 | Inoue | 51/165.77 |

FOREIGN PATENT DOCUMENTS 1253238 11/1971 United Kingdom .

Primary Examiner—Harold D. Whitehead
Attorney, Agent, or Firm—Peter K. Kontler

[57] ABSTRACT

A double head grinding machine for the roots of turbine blades or similar complex workpieces with concave and/or convex surfaces has two parallel horizontal spindles the upper of which carries a single grinding wheel and the lower of which carries two coaxial grinding wheels. The base of the machine frame supports a table which is movable by a first motor in a direction at right angles to the axes of the spindles, tangentially of the grinding wheels and along a horizontal path below the spindles. A work holder on the table is movable by a second motor along a sloping path in a direction making an angle of 30 degrees with the axes of the spindles and at right angles to the direction of movement of the table in such a way that the workpiece which is held in the holder can be moved toward or away from the grinding wheels. The movements of the table and work holder in the two directions are controlled by discrete circuits or by a computer so as to impart to the workpiece a composite movement having a component in the direction of movement of the table and a component in the direction of movement of the work holder with reference to the table. At least one of the grinding wheels has a frustoconical working surface section whose inclination with reference to a plane that is normal to the axes of the spindles is also 30 degrees. The grinding machine renders it possible to treat or form arcuate surfaces whose radii of curvature greatly exceed the radii of the grinding wheels.

13 Claims, 3 Drawing Figures

GRINDING MACHINE

CROSS-REFERENCE TO RELATED APPLICATION

A grinding machine with two heads which can be used for the treatment of turbine blades or analogous workpieces is disclosed in the commonly owned copending patent application Ser. No. 232,250 filed Feb. 6, 1981, now U.S. Pat. No. 4,417,422, dated Nov. 29, 1983, by Werner Redeker and Uwe Uhlig.

BACKGROUND OF THE INVENTION

The present invention relates to grinding machines in general, and more particularly to improvements in grinding machines whose grinding wheel or wheels can treat and/or form relatively complex surfaces, for example, surfaces bounding the grooves at the roots of turbine blades or the like. Such surfaces often exhibit several curvatures, i.e., two or more convex and/or concave portions having different radii of curvature.

It is already known to treat the surfaces which surround the grooves at the roots of turbine blades by resorting to grinding machines wherein one or more horizontal spindles for grinding wheels are movable up or down and the workpiece is mounted on a table or an analogous support for movement along a horizontal path and substantially at right angles to the axes of the spindles. It is further known to indirectly mount the work holder on the table in such a way that the workpiece can move with reference to the table and in parallelism with the axes of the spindles. The grinding wheel or wheels in such a machine can readily treat a rather complex surface or two or more surfaces by moving the work holder with as well as relative to the table. For example, such composite movements of the work holder can be carried out to machine grooves in one end portion of a turbine blade or a like workpiece. As a rule, the working surfaces of grinding wheels are their peripheral surfaces, and such surfaces can machine grooves into a workpiece which is moved with the table substantially tangentially of the grinding wheels. If the work holder is simultaneously caused to move in a direction which is parallel to the axes of the spindles, each grinding wheel provides the workpiece with a horizontal groove, and the depth of such grooves can vary in response to simultaneous movement of the work holder in parallelism with the axes of the spindles. Thus, the just outlined mode of regulating the operation of the grinding machine can entail the formation of grooves which are bounded in part by parallel surfaces and in part by convex or concave surfaces (in the deepmost regions or the grooves).

Additional possibilities of forming and/or treating complex surfaces in a grinding machine of the above outlined type are presented by movability of the spindles at right angles to their axes, i.e., toward and away from the base or bed which carries the table. This renders it possible to impart a certain curvature to the surfaces which would be flat or would remain flat in the absence of any upward or downward movement of the grinding wheels while the work holder is moved with and/or relative to the table. However, the just described movements of the spindles at right angles to their axes can only take place while the work holder is held against movement in parallelism with the axes of the spindles, i.e., the grooves which are formed during such movement of the spindles are again bounded, at least in part, by flat surfaces. In other words, one cannot provide a workpiece with a surface which is a portion of a concave or convex spherical surface, i.e., which exhibits different curvatures in different directions.

On the other hand, the formation or treatment of surfaces which are more complex than those which can be treated or formed in presently known grinding machines is often desirable or necessary, especially in connection with the making and/or treatment of turbine blades or the like. Thus, the root portion of each of a certain type of turbine blades must be provided with a first set of grooves at one side and with a mirror symmetrical second set of grooves at the other side of the blade. The surfaces which flank the grooves are rather complex, i.e., a first part of each groove must be bounded by a concave surface portion, another part of the same groove must be bounded by a convex surface portion, the concavity or convexity need not be constant, etc. In accordance with heretofore known practice, such complex surfaces are formed and/or treated by resorting to so-called cup wheels or face wheels. The radii of the working surfaces on such grinding wheels match the radii of curvature of the treated surfaces. This presents serious problems when the radius of curvature of a surface to be treated or formed is relatively large or very large, i.e., it is necessary to employ large-diameter cup wheels or face wheels with attendant pronounced increase in complexity, bulk and initial as well as maintenance cost of the grinding machine. Therefore, it is not possible to increase the diameter of a grinding wheel at will because this would entail a prohibitive increase of the cost of the grinding machine and of the products, at least for a large number of applications.

German Pat. No. 705,817 discloses a method of grinding arcuate surfaces on the teeth of chucks. The method must be practiced by resorting to a specially designed grinding wheel in lieu of a cup wheel, namely, a grinding wheel whose marginal portion is configurated with a view to allow for penetration into the deepmost regions of tooth spaces without undesirable contact between the working surface of the grinding wheel and the remaining portion or portions of surface bounding the tooth space which receives a portion of the grinding wheel. The grinding wheel is pivoted while it extends into a tooth space so that the workpiece rolls along the surface which flanks the tooth space all the way from the one to the other end of the tooth space. Such pivoting of the grinding wheel would present many problems in a grinding machine which is designed for mass treatment of workpieces, i.e., the controls for pivotal movements of one or more grinding wheels and their spindles would contribute excessively to the complexity, cost and sensitivity of the machine. The complexity (with attendant increase of proneness to malfunction) is especially pronounced if the machine for the practice of the method disclosed in the German patent is to machine arcuate (such as convex, concave, multi-convex or multi-concave) surfaces with a high or very high degree of accuracy and reproducibility.

British Pat. Nos. 1,253,238 and 1,349,864 disclose multiple-spindle peripheral grinding machines with inclined work holders. Such work holders are movable on a table along horizontal paths and at right angles to the axes of the spindles. The purpose of the patented machines is to allow for treatment of plane surfaces in the slots of jaws for use in universal chucks.

East German Pat. No. 135,358 discloses a grinding machine for pilgrim rolls of rolling mills. The machine employs a control system which changes the position as well as the orientation of the grinding wheel. This contributes to complexity of the machine, the same as in accordance with the teaching of the aforementioned German Pat. No. 705,817. Therefore, such machine is not suited for the treatment of roots of turbine blades or analogous complex workpieces with a requisite degree of accuracy as well as at a reasonable cost.

OBJECTS AND SUMMARY OF THE INVENTION

An object of the invention is to provide a novel and improved grinding machine which is capable of treating highly complex workpieces, especially workpieces with complex arcuate surfaces, and which is not only simpler but also more reliable and more accurate than heretofore known grinding machines.

Another object of the invention is to provide the grinding machine with novel and improved means for supporting and moving the workpieces.

A further object of the invention is to provide a grinding machine whose grinding wheel or wheels can treat surfaces with large or extremely large radii of curvature even though the radius of each wheel is or may be only a small fraction of the maximum radius or radii of curvature.

An additional object of the invention is to provide a grinding machine wherein the grinding wheel or wheels need not change its or their orientation in the course of treatment of highly complex surfaces, such as those flanking the grooves in the roots of turbine blades.

Another object of the invention is to provide a grinding machine which can perform the above outlined functions without resort to cup wheels.

An additional object of the invention is to provide a grinding machine for the roots of turbine blades or like workpieces whose prime movers can be operated by relatively simple controls.

Another object of the invention is to provide the grinding machine with novel and improved means for moving and guiding the work holder.

A further object of the invention is to provide novel and improved grinding wheels for use in a machine of the above outlined character.

The invention resides in the provision of a grinding machine, particularly for the formation and/or treatment of relatively complex arcuate surfaces in the grooves of turbine blades or analogous workpieces. The grinding machine comprises a rotary spindle whose axis is preferably horizontal, at least one grinding wheel which is coaxial with and is driven by the spindle, a base or an analogous stationary frame member or portion, a movable support (e.g., a table) on the base, first prime mover means (e.g., a first reversible electric motor) operable to move the support in a first direction at least substantially at right angles to the axis of the spindle and tangentially of the grinding wheel (the path which the base defines for the support is preferably a horizontal path), a movable work holder on the support (such work holder can be mounted on a carriage which, in turn, can be mounted on the support through the medium of a second support), second prime mover means operable to move the work holder in a second direction at right angles to the first direction, toward or away from the grinding wheel, and at an acute angle (e.g., an angle of at least substantially 30 degrees) to the axis of the spindle, and control means (e.g., a computer) for operating the first and second prime mover means so as to effect a composite movement of the work holder, namely, a movement having a first component in the first direction and a second component in the second direction. This enables a relatively small grinding wheel to treat arcuate surfaces whose radii of curvature greatly exceed the radius of the grinding wheel.

The carrier for the spindle is preferably movable in a third direction at right angles to the axis of the spindle and to the first direction. The axes of the work holder (which is elongated if it is to support turbine blades or analogous workpieces) and of the spindle can be located in a common vertical plane.

The grinding machine preferably further comprises a second rotary spindle whose axis is parallel to the axis of the first mentioned spindle, and a second grinding wheel which is coaxial with and driven by the second spindle and is adjacent to the first mentioned grinding wheel. This renders it possible to simultaneously treat two discrete surfaces or surface portions of a workpiece in or on the work holder. The grinding machine may further comprise an additional grinding wheel which is driven by one of the two spindles and is coaxial with the respective one of the first mentioned grinding wheels; this renders it possible to simultaneously treat or form three discrete surfaces or surface portions on one and the same workpiece. The axes of the two spindles can be located in a common vertical plane and the base can define for the support a straight path which is preferably horizontal and substantially tangential to the grinding wheels. The carrier for the second spindle is preferably movable with the carrier for the first mentioned spindle, i.e., at right angles to the axes of the spindles and preferably along a vertical or nearly vertical path.

The working surface of the grinding wheel (or the working surfaces of two or more grinding wheels) can have a frustoconical section which is inclined with reference to a plane that is normal to the axis of the spindle. The inclination of the frustoconical section with reference to such plane preferably equals the aforementioned acute angle; this further enhances the versatility of the grinding machine.

The first prime mover means can be mounted on the base, and the second prime mover means may also constitute a reversible motor which is mounted on the support.

The novel features which are considered as characteristic of the invention are set forth in particular in the appended claims. The improved grinding machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 1A, 1B:
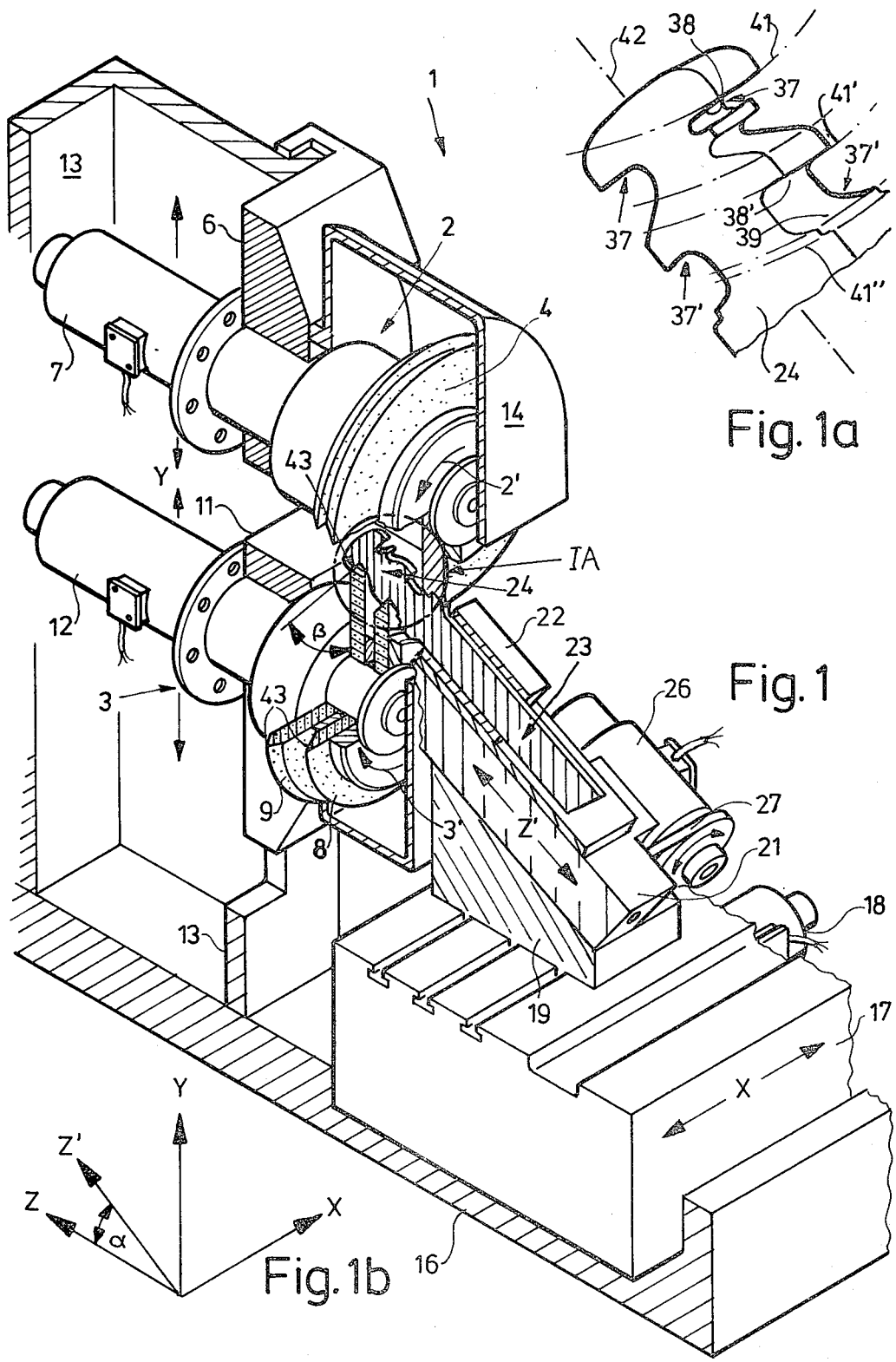
FIG. 1 is a fragmentary partly sectional perspective view of a grinding machine which embodies one form of the invention and comprises a total of three grinding wheels on two parallel spindles.
FIG. 1a is an enlarged perspective view of the end portion of a workpiece within the phantom-line circle IA of FIG. 1.
FIG. 1b is a vector diagram illustrating the directions of movement of various component parts of the grinding machine shown in FIG. 1.

FIG. 1 shows a portion of a double-head grinding machine 1 with two parallel horizontal spindles 2 and 3. The upper spindle 2 carries a single grinding wheel 4 and is rotatable in a spindle carrier 6 in response to starting of a first electric motor 7. The lower spindle 3 carries two coaxial grinding wheels 8 and 9, it is rotatably mounted in a second spindle carrier 11, and it receives torque from a discrete second electric motor 12. The directions in which the spindles 2 and 3 are respectively rotated when the motors 7 and 12 are on are indicated by arrows 2' and 3'. The carriers 6 and 11 are mounted on an upright column 13 and are shiftable with reference thereto at right angles to the axes of the spindles 2 and 3. Thus, if the axes of the spindles 2 and 3 are horizontal, their carriers 6 and 11 are movable vertically up and down. The arrow Y of FIG. 1b denotes the directions of movement of the carriers 6, 11 with reference to the column 13, and the arrow Z of FIG. 1b is parallel to the axes of the spindles 2 and 3. The reference character 14 denotes a housing or shell which at least partially surrounds the upper grinding wheel 4.

The grinding machine 1 of FIG. 1 further comprises a base or bed 16 for a table or support 17 which is reciprocable along a horizontal path as indicated by the arrow X, namely, at right angles to the axes of the spindles 2 and 3. Thus, the direction of movement of the table 17 is normal to the axes of the spindles 2, 3 as well as to the direction of reciprocatory movement of the carriers 6 and 11 with reference to the column 13. Furthermore, the path or direction which is denoted by the arrow X is tangential to the grinding wheels 4, 8 and 9. The table 17 is rigid with a support 19 and is movable in directions indicated by the arrow X in response to operation of a prime mover here shown as a reversible electric motor 18. The motor 18 is mounted on the base 16. The support 19 has a sloping upper side which serves as a guide means for a carriage 21 which is reciprocable in directions indicated by an arrow Z', namely, at an acute angle alpha of approximately or exactly 30 degrees with reference to the axes of the spindles 2 and 3. This can be readily seen in FIG. 1b wherein the arrow Z' is parallel with the sloping upper side of the support 19, i.e., with the ways (if any) for the carriage 21. This carriage is movable by a second prime mover here shown as a reversible electric motor 26 which is secured to the support 19 and drives a toothed belt or chain 27 for a feed screw (not shown) in mesh with a nut at the underside of the carriage 21. The work holder 22 for a workpiece 23 (e.g., a turbine blade) is fixedly mounted on and thus shares all movements of the carriage 21 with as well as relative to the support 19. The end portion or foot or root 24 of the turbine blade 23 is to be treated by the working surfaces of the grinding wheels 4, 8 and 9.

The arrow Z' shown in FIG. 1b is located in a plane which is common to the arrows Y and Z, i.e., this plane includes the common axis of the shafts of the grinding spindles 2 and 3. As mentioned above, the arrow Z is parallel to the axes of the spindles 2, 3 and the arrow Y denotes the direction of upward or downward movement of the carriers 6, 11 for the spindles 2 and 3. The motor 26 is designed to move the workpiece 23, its holder 22 and the carriage 21 in the directions indicated by the arrow Z' which is shown in FIG. 1, i.e., at an acute angle alpha to the axes of the spindles 2, 3 and toward or away from the grinding wheels 4, 8 and 9. FIG. 1 shows that the motor 26 for the carriage 21 is mounted at one side of the support 19 so that it does not interfere with insertion of workpieces 23 into or removal of such workpieces from the holder 22. If desired, the holder 22 can be assembled with a workpiece 23 at a locus which is remote from the grinding station, and the assembly of the holder 22 and a freshly inserted workpiece 23 therein is thereupon attached to the carriage 21. The support 19 (with the carriage 21 and holder 22) is adjustable with reference to the table 17 in the directions indicated by arrows X and Z; however, when the grinding machine 1 is in use, the support 19 and the table 17 move as a unit.

Figure 2:
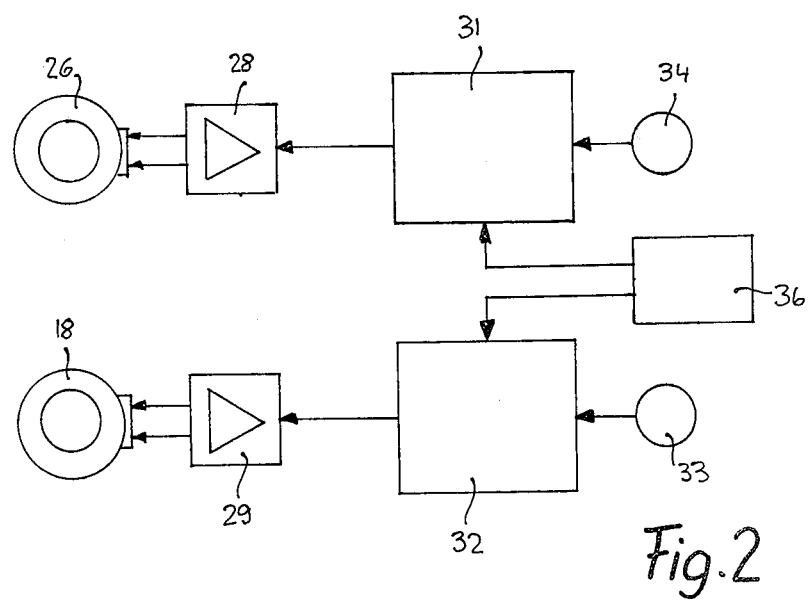
FIG. 2 is a circuit diagram of the controls for two of the prime movers in the machine of FIG. 1.

FIG. 2 shows schematically the controls for the electric motors 18 and 26 which respectively drive the support 19 and the carriage 21 with work holder 22. The controls are relatively simple since the motors 18 and 26 are merely required to move a workpiece 23 in the direction of arrow Z' and/or in the direction of arrow X, i.e., at an acute angle to the axes of the spindles 2, 3 or at right angles to the axes of the grinding wheels 4, 8 and 9. The motors 18 and 26 respectively receive signals, from the outputs of operational amplifiers 29 and 28 whose inputs are respectively connected with control circuits 32 and 31. The control circuits 31, 32 have first inputs which are respectively connected with detectors 34 and 33 serving to monitor the positions of the carriage 21 as considered in the directions of arrows X and Z'. The second inputs of the control circuits 31, 32 are connected with a source 36 of reference signals denoting the selected or desired positions of the table 17 and work holder 22, i.e., those positions in which the motor 18 and/or 26 must be started, arrested and/or driven at a different speed.

FIG. 1a is an enlarged perspective view of the end portion or root 24 of the workpiece 23. The profile of this end portion exhibits four grooves including a pair of grooves 37, 37' at one side and a similarly referenced pair of grooves at the other side of the workpiece. The grooves 37, 37' at one side are mirror symmetrical to the grooves 37, 37' at the other side of the workpiece 23 with reference to a plane which includes the longitudinal axis 42 (indicated by phantom lines) of the workpiece. The surfaces flanking the two grooves 37 and the two grooves 37' must be treated by the wheels 4, 8 and 9 in such a way that the surface portions 38 and 38' will be concave, as considered in a direction toward or away from the axis 42, but will be convex as considered along the arcs 41 and 41'. The opposite portions 39 of surfaces flanking the grooves 37 and 37' should be convex, as considered in directions toward and away from the axis 42 but concave as considered along the arc 41".

In heretofore known grinding machines, finishing of surfaces corresponding to those on the end portion 24 of FIG. 1a was accomplished by resorting to so-called cup wheels or face wheels, namely, grinding wheels with working surfaces having radii corresponding to those of the arcs 41, 41' and 42", i.e., to radii of curvature of the surface portions to be treated. This presents many problems when the radii of curvature of the surfaces to be treated are very large because the machine must employ very large grinding wheels. The cost and complexity of the grinding machine increase considerably with increasing diameters of the grinding wheels which are to be used therein. In accordance with the invention, the aforediscussed surface portions on the end portion 24 can be treated by resorting to relatively small grinding wheels. This will be readily appreciated upon perusal of the following description of the mode of operation of the improved grinding machine.

The workpiece 23 which constitutes a turbine blade is mounted in the work holder 22 in such a way that its longitudinal axis 42 (arrow Z' in FIG. 1b) makes the acute angle alpha with the axes (arrow Z) of the spindles 2 and 3. In order to treat the surface portions 38 and 38' of the end portion 24 of the workpiece 23 in the holder 22, the table 17 is moved relative to the base or bed 16 (arrow X) in response to starting of the motor 18. At the same time, the carriage 21 for the holder 22 and workpiece 23 is moved in the direction of arrow Z' under the action of the motor 26. The relationship between the movements of the table 17 and carriage 21 (in order to impart to the surface portions 38 and 38' the aforediscussed configurations) is determined by the source 36 of reference signals so that the curvatures of the surface portions 38 and 38' will exhibit preselected radii. The signals from the source 36 are transmitted to the control circuits 31 and 32 for the amplifiers 28, 29 and the respective motors 26, 18. The detectors 33 and 34 transmit signals which denote the positions of the table 17 (as considered in the direction of arrow X) and of the carriage 21 and work holder 22 (as considered in the direction of arrow Z'). The signals which are generated and transmitted by the detectors 33, 34 are compared with signals from the source 36 of reference signals; such comparison takes place in the control circuits 31 and 32 the exact design of which forms no part of the invention. All that counts is to provide control circuits which prevent the motors 18 and 26 from driving the respective components (table 17 and work holder 22) in such a way that the radii of curvature of the surface portions 38 and 38' deviate from the desired values. These control circuits are commercially available components, preferably of the type embodying closed loop position controls with subordinated velocity regulating circuits.

Figure 3:
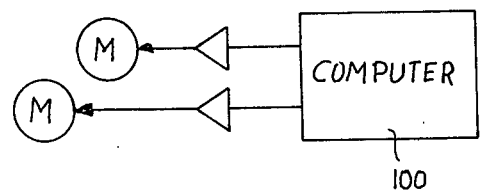
FIG. 3 is a schematic representation of modified means for operating the prime movers which effect movements of the work holder in the desired directions.

The source 36 of reference signals may comprise a reader of signals which are encoded in or otherwise stored on magnetic or other tape and denote the desired progress of the grinding operation, i.e., the desired configuration of flanks of the ribs or analogous projections on the end portion 24 of the workpiece 23. It is clear that the just discussed reader for magnetic tape or the like constitutes but one form of means which can furnish the necessary reference values for comparison with signals transmitted by the position monitoring devices or detectors 33 and 34. For example, one can resort to a computer (see the computer 100 of FIG. 3) especially to a microprocessor, which can transmit signals to the amplifiers 28 and 29 for effecting the operation of prime movers 26 and 18 at the desired speed and for the desired intervals of time.

Controlled shifting of the workpiece 23 in the directions which are indicated by arrows X and Z' entails the desired treatment of the surfaces bounding the grooves 37 and 37', i.e., selected portions of finished surfaces will exhibit predetermined radii of curvature and the desired degree of finish. Since the lower spindle 3 carries two grinding wheels (8, 9), the lower grinding head of the machine 1 shown in FIG. 1 can simultaneously treat the corresponding surface portions 38 and 38' in the grooves 37 and 37' at the underside of the end portion 24, as viewed in FIG. 1. At the same time, the grinding wheel 4 on the upper spindle 2 treats the surface portion 39 in the upper groove 37. The curvature of the surface portion 39 in the upper groove 37' (as viewed in FIG. 1 or 1a) is just the opposite of that of surface portions 38 and 38' in the lower grooves 37 and 37'.

It will be noted that each pass of the workpiece 23 along the grinding wheels 4, 8 and 9 entails the treatment of three arcuate surface portions in the grooves of the end portion 24. This contributes to rapid completion of the treatment, to lower cost of the treatment and to a higher output of the grinding machine.

If the machine is to treat a surface or surface portion 38 which is substantially normal to the common plane of the arrows X and Z' shown in FIG. 1b, the frustoconical working surface section 43 of the grinding wheel 9 makes an acute angle beta with a plane which is normal to the common axis of the spindle 3 and grinding wheels 8, 9 (i.e., with a plane which is parallel to the two end faces of the grinding wheel 9). The angle beta equals or closely approximates the angle alpha. Furthermore, the angle beta equals the angle between the frustoconical working surface section 43 of the front grinding wheel 8 on the spindle 3 and the end faces of this grinding wheel as well as the end faces of the grinding wheel 9. The surface section 43 of the grinding wheel 8 treats the surface portion 38' in the lower groove 37', as viewed in FIG. 1, i.e., in the left-hand groove 37', as viewed in FIG. 1a.

An important advantage of the improved grinding machine is that it can treat or machine surfaces whose radii of curvature are large, medium large or very small even though the grinding wheels 4, 8 and 9 need not be large. In other words, the radii of these grinding wheels can be much smaller than the radii of curvature of surfaces which are treated by such grinding wheels. Moreover, the controls (see FIG. 2 or 3) for the motors 18 and 26 which effect a two-coordinate movement of the work holder 22 are relatively simple and can be readily adjusted or programmed so as to enable the machine to treat a wide variety of workpieces. Furthermore, by the simple expedient of using a double head grinding machine, the time which is needed for completion of the treatment of a turbine blade or an equally complex workpiece can be reduced to a fraction of the time which is required for such treatment in a machine employing a single grinding wheel. All that is necessary is to utilize grinding wheels (such as the grinding wheels 8 and 9) with properly configured working surface sections (refer to the aforediscussed angles beta); this renders it possible to simultaneously finish two or more surface portions having relatively small, relatively large or medium-sized radii of curvature. The arrangement is then preferably such (as discussed in connection with the operation of the grinding machine 1 shown in FIG. 1) that the curvature of flanks or surface portions at one side of the workpiece is opposite to that of the flanks or surface portions at the other side of the workpiece. The improved machine has been found to be highly reliable, more economical than heretofore known machines for the treatment of turbine blades or the like, and capable of treating successive workpieces with a surprisingly high degree of reproducibility.

Another important advantage of the improved grinding machine is that it can carry out a wide variety of highly complex treatments even though it need not employ cup wheels and/or grinding wheels which pivot or otherwise change their orientation as the treatment progresses. All that is necessary is to select for the motors 18 and 26 suitable controls which allow the work holder 22 to perform (when necessary) a composite movement having a component in the direction of the arrow X as well as a component in the direction of arrow Z' (as viewed in FIG. 1b). The ratio of the two components determines the exact configuration of the surfaces or surface portions which are treated by the improved grinding machine. Thus, by the simple expedient of mounting the work holder 22 for movement substantially tangentially of the grinding wheels as well as at an acute angle to the axes of the spindles 2 and 3 (toward and away from the grinding station), one can treat surfaces which, heretofore, necessitated a treatment by cup wheels and/or in machines wherein the orientation of the grinding wheels must be changed while the grinding operation progresses with attendant greatly increased complexity, initial cost and maintenance cost of such conventional machines.

The controls of the improved grinding machine are very simple since all the work holder 22 has to do is to perform a composite movement in the directions indicated by arrows X and Z', i.e., in two mutually inclined directions. Such controls are much less expensive and more reliable than many controls which are used in conventional grinding machines whose versatility does not match that of the illustrated machine. It is clear that the illustrated support 19 can be replaced with a support which allows the work holder 22 to move along a path extending in parallelism with the axes of the spindles 2, 3 if the grinding machine is to be converted for the treatment of simpler surfaces or workpieces.

It is further clear that the improved machine can be simplified by utilizing a single spindle with a single grinding wheel, by utilizing a single spindle with several coaxial grinding wheels or by utilizing several spindles each of which carries a single grinding wheel. The illustrated machine exhibits the aforediscussed advantage of allowing for simultaneous treatment of several surfaces or surface portions, i.e., the output of a double head grinding machine is incomparably higher than that of a machine having a single spindle with one or even two grinding wheels. The utilization of a grinding machine with two spindles is especially desirable and advantageous in connection with the treatment of certain types of workpieces, i.e., such as the turbine blade 23 wherein one can machine or form a convex surface or surface portion at one side while simultaneously forming a concave surface or surface portion at the other side of the workpiece.

The utilization of grinding wheels with frustoconical working surface sections 43 renders it possible to further enhance the versatility of the machine. Thus, such configuration of the working surface or surfaces of one or more grinding wheels renders it possible to impart appropriate configuration to surfaces in a direction at right angles to the plane including the arrows X and Z' of FIG. 1b. The angle beta, which equals the angle alpha, is preferably 30 degrees. This allows for the treatment of surfaces or surface portions whose radii of curvature equal the diameter of the grinding wheel 4, 8 or 9.

Still another advantage of the improved grinding machine is that it can be rapidly converted into a grinding machine for the treatment of relatively simple workpieces in a conventional manner or vice versa. Thus, all that is necessary is to provide an existing machine with the necessary controls and to equip such existing machine with the support 19 and motor 26 in order to move the work holder in a direction making an acute angle with the axes of the spindles 2, 3 and extending at right angles to the direction of movement of the table 17.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a grinding machine for the formation and/or treatment of concave and convex flanking surfaces in grooves in regions other than the bottoms of the grooves of turbine blades or analogous workpieces, the combination of a rotary spindle; a grinding wheel having a grinding periphery coaxial with and driven by said spindle; a base; a movable support on said base; first prime mover means operable to move said support in the course of a grinding operation in a first direction substantially at right angles to the axis of said spindle; a movable work holder on said support; second prime mover means operable to move said work holder in the course of a grinding operation in a second direction at right angles to said first direction, toward and away from the periphery of said grinding wheel, and at an acute angle to the axis of said spindle; and control means for operating said prime mover means to effect a composite movement of said work holder in a plane which makes said acute angle with said spindle for grinding said concave or convex surfaces, such composite movement having components in said first and second directions.

2. The combination of claim 1, wherein said first direction is substantially tangential to said grinding wheel.

3. The combination of claim 1, further comprising carrier means for said spindle, said carrier means being movable in a third direction at right angles to said axis and to said first direction.

4. The combination of claim 1, wherein said support is movable along a substantially horizontal path.

5. The combination of claim 4, wherein said holder has an elongated axis, the axes of said holder and said spindle being located in a common vertical plane.

6. The combination of claim 1, further comprising a second rotary spindle having an axis parallel to the axis of said first mentioned spindle, and a second grinding wheel coaxial with and driven by said second spindle and adjacent to said first mentioned grinding wheel.

7. The combination of claim 6, further comprising an additional grinding wheel driven by one of said spindles and coaxial with the respective one of said first mentioned grinding wheels.

8. The combination of claim 6, wherein said base defines for said support a straight path which is substantially tangential to said grinding wheels.

9. The combination of claim 6, further comprising carriers for said spindles, said carriers being movable at right angles to the axes of said spindles and to said first direction.

10. The combination of claim 1, wherein said grinding wheel periphery includes including a frustoconical section inclined with reference to a plane which is normal to the axis of said spindle, the inclination of said section with reference to said plane matching said acute angle.

11. The combination of claim 1, wherein said acute angle at least approximates 30 degrees.

12. The combination of claim 1, wherein said control means comprises a computer.

13. The combination of claim 1, wherein said first prime mover means comprises a first motor on said base and said second prime mover means comprises a discrete second motor on said support.

* * * * *